Patented Feb. 21, 1928.

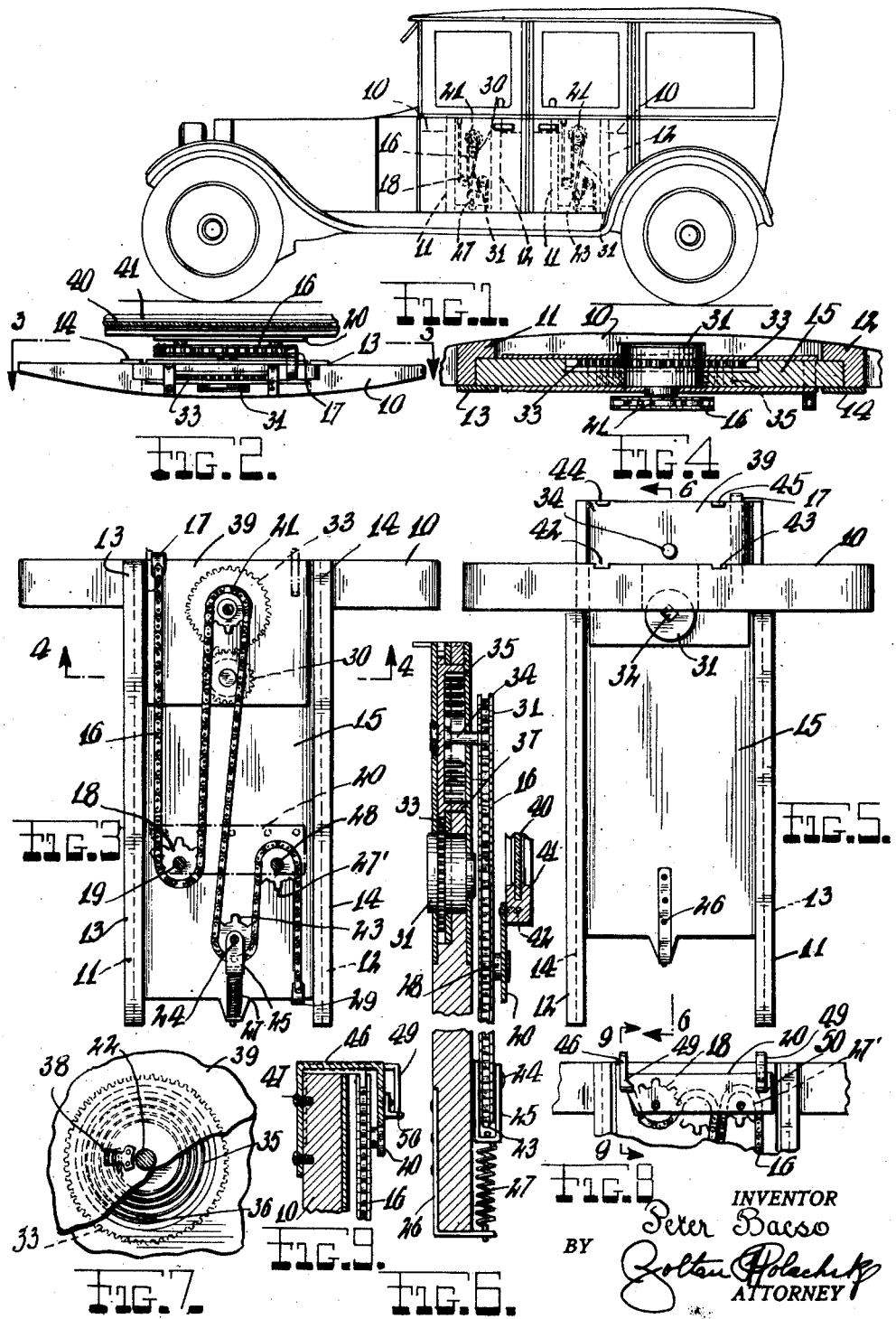

1,659,587

UNITED STATES PATENT OFFICE.

PETER BACSO, OF ASTORIA, NEW YORK.

WINDOW REGULATOR FOR VEHICLES.

Application filed May 19, 1927. Serial No. 192,540.

This invention relates to a new and useful device in the nature of a window regulator for motor vehicles, particularly adapted for the purpose of opening and closing windows in motor vehicles of the closed body type.

An object of the invention is to provide a window regulator easily and readily removable in event of repairs or replacement.

A further object of the invention is to provide a window regulator for motor vehicles, of novel construction and arrangement of parts, hereinafter, more fully described, claimed and illustrated in the accompanying drawing.

Fig. 1 is a side elevational view of a motor vehicle of the closed body type embodying window regulators constructed in accordance with the invention.

Fig. 2 is a top plan view of my improved window regulator.

Fig. 3 is a sectional elevational view thereof, taken on the line 3—3 of Fig. 2.

Fig. 4 is an enlarged transverse sectional view taken on the line 4—4 of Fig. 3.

Fig. 5 is a front elevational view of my improved device.

Fig. 6 is an enlarged fragmentary vertical sectional view taken on the line 6—6 of Fig. 5.

Fig. 7 is a detail view of the spring mechanism as embodied in my improved device.

Fig. 8 is a fragmentary view illustrating in particular the method of securing the window proper to my improved device.

Fig. 9 is an enlarged vertical sectional view taken on the line 9—9 of Fig. 8.

As here embodied my improved device comprises a cross member 10, having attached thereto, and extended downwardly therefrom guide members 11 and 12, provided with longitudinal recesses, and having attached thereto strip members 13 and 14, respectively, so as to form a longitudinal recess or groove adapted to slidably receive the plate member 15.

The above described construction is such as will provide a supporting means or frame adapted to slidably receive the plate member 15. It is understood that the above described frame may be constructed integral with the body of a motor vehicle, the cross member 10, comprising the window sill.

In Fig. 5 of the accompanying drawing, I have shown the plate member 15, and correlated component parts, partly removed from the said frame.

The flexible member 16, preferably a chain, is secured as at 17, by a clip, to the upper edge of the plate member 15, and is extended over the sprocket 18, rotatively mounted on the shaft 19, secured to the bar member 20, and is similarly extended over the sprocket 21, secured to the shaft 22. The flexible member is also extended over the sprocket 23, rotatively mounted on the shaft 24, secured to the yoke member 25, flexibly secured to the bracket 26, by means of the expansion spring 27. The bracket 26, is attached to the lower portion of the plate member 15. The flexible member 16 is also extended over the sprocket 27, rotatively mounted on the shaft 28, secured to the bar member 20. The flexible member 16 is secured as at 29 by a clip, to the lower edge of the plate member 15.

The pinion 30 is secured to the disc member 31 rotatively mounted in a recess formed in the plate member 15. The disc member 31, has formed therein an axial aperture 32, preferably of square cross-section, adapted to removably receive the extended element of a handle, not shown in the accompanying drawing, as a means of rotating or turning the pinion 30, for the purpose as hereinafter described and set forth.

The pinion 30, meshes with the gear 33, secured to the shaft 34, to which the sprocket 21 is secured, rotatively mounted in the plate member 15. The helical spring 35 is secured, as at 36, by a clip, to the extended portion 37 of the gear 33, and is similarly secured, as at 38 to the cover member 39 attached to the plate member 15.

The above described construction is such as will permit the sprocket 30, when rotated, as above set forth, to raise and lower the bar member 20. It is to be understood that the spring 35, will be wound when the bar member 20 is lowered so as to assist in the raising of the bar member 20.

The window proper 40, preferably of plate glass is mounted in the usual frame 41, secured at its lower edge, as at 42, by threaded members, bolts, screws or the like, to the bar member 20, as a means of permitting the window proper 40 to be raised or lowered, when the bar member 20, is raised or lowered, as above set forth.

The cross member 10 has formed therein, notches 42 and 43 adapted to receive the extended elements of the cover member 39, so as to limit the engagement of the plate member 15, in the said frame.

The bracket 46 is secured as at 47 by screws, bolts, or the like to the upper portion of the cross member 10, and is provided with extended portions 49, adapted to engage or strike the stop member 50, secured to the bar member 20, when the window proper 40, is in a closed position, so as to limit the upper movement of the window proper 40, and so as to hold the bar member 20, in a horizontal position when fully raised, which will facilitate the placing and removal of the window proper 40.

Having thus described my invention, what I claim as new and desire to protect by Letters Patent of the United States is as follows:

1. In a window regulating device of the class described, a frame comprising side members having longitudinal grooves therein, a plate engaged at its edges in said grooves and removably mounted in said frame, spaced apart shafts journaled in apertures in said plate, gears on said shafts meshed with each other, a sprocket on the uppermost of said shafts, a sprocket resiliently attached to the bottom of said plate, a bar disposed between the sides of said frame, spaced apart sprockets rotatively mounted on said bar, a sprocket chain disposed over all of said sprockets and attached at its upper and lower extremities to the upper and lower extremities of said plate, means on said sprocket for supporting a window and window frame, spaced stops on said bar, and brackets on said first mentioned frame adapted to engage the stops on said bar for retaining the latter and the window attached thereto in a predetermined position, said plate and the mechanism attached thereto being removable in assembled relation from said first mentioned frame.

2. In a window regulating device of the class described, a frame comprising side members having longitudinal grooves therein, a plate engaged at its edges in said grooves and removably mounted in said frame, spaced apart shafts journaled in apertures in said plate, gears on said shafts meshed with each other, a sprocket on the uppermost of said shafts, a sprocket resiliently attached to the bottom of said plate, a bar disposed between the sides of said frame, spaced apart sprockets rotatively mounted on said bar, a sprocket chain disposed over all of said sprockets and attached at its upper and lower extremities to the upper and lower extremities of said plate, means on said sprocket for supporting a window and window frame, and a spring associated with the uppermost of said shafts and operatively connected therewith adapted to be tensioned when said shaft is rotated for lowering said bar and to assist in rotation of said uppermost shaft for raising said bar.

3. A window regulator of the class described comprising a frame mounted between the inner and outer walls of a vehicle, a plate member removably mounted in said frame, a bar disposed adjacent said plate adapted to move longitudinally thereof, operating mechanism mounted on said plate and operatively connected with said bar adapted to raise and lower the same, said operating mechanism being removable in assembled condition with said plate, spring mechanism associated with said operating mechanism adapted to be tensioned during the lowering of said bar and to assist in raising thereof, and a window attached to said bar.

In testimony whereof I have affixed my signature.

PETER BACSO.